Nov. 17, 1931.  G. L. WEBER  1,832,598
PLANETARY GEAR WHEEL FOR POWER VEHICLES
Filed Aug. 23, 1927   2 Sheets-Sheet 1

Inventor
George L. Weber,
By Mason, Fenwick & Lawrence
Attorneys

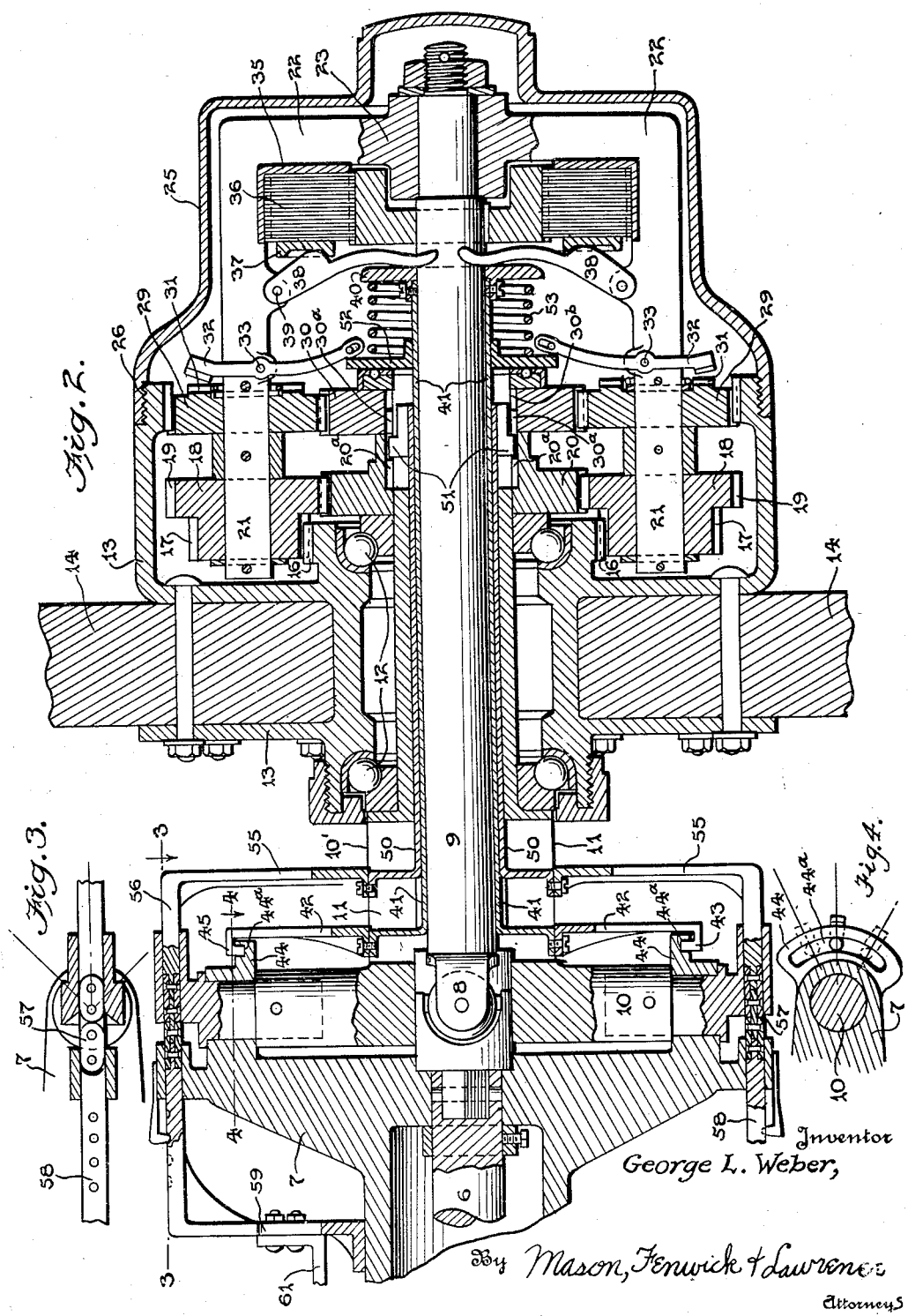

Patented Nov. 17, 1931

1,832,598

UNITED STATES PATENT OFFICE

GEORGE L. WEBER, OF PHILADELPHIA, PENNSYLVANIA

PLANETARY GEAR WHEEL FOR POWER VEHICLES

Application filed August 23, 1927. Serial No. 214,966.

This invention relates to power transmitting mechanism, and more particularly to a drive and steering wheel for vehicles of the self-propelled type.

It is one of the objects of the present invention to provide a wheel for a vehicle in which connections are incorporated whereby power may be transmitted from a driving shaft directly to the wheel structure.

Another object of the invention is to provide for the pivotal connection of the wheel with respect to the driving axle.

Another object of the invention is to provide a wheel structure for vehicles including a pivoted spindle connected to a suitable driving shaft and which is combined with a gear organization mounted on and pivoting with the wheel.

It is also an object of the invention to provide a driving wheel embodying a gear set of the planetary type so constructed, designated and organized to provide for two speeds and a reverse of the wheel with respect to its driving spindle.

Another object is to provide articulated connections operable from a suitable control station on a vehicle, for instance, for selectively locking the gears in desired relation.

It is also an object of the invention to provide means for accomplishing the disconnection of the driven gears in the wheels or in one of the wheels from the driving spindle of the wheel when one of the wheels is swiveled bodily in a turning function of the vehicle so as to enclutch the driving spindle from the driven gear and to provide for the automatic action of this clutching of the driving and driven elements when the wheel swivels or castors.

With these and other objects in view, as will be rendered manifest to those skilled in the art, the invention consists of the construction, the combination, and in details and arrangements of the parts as more particularly described in the following specification relative to an embodiment of the invention, illustrated in different forms in the accompanying drawings, in which Figure 1 is a plan view of a front axle structure provided with castoring or steering wheels, one of which is broken away through its center plane perpendicular to its axis, whilst the other of which is broken away at its top portion to show the adjacent parts.

Figure 2 is a detail longitudinal central section through the wheel hub and knuckle organization.

Figure 3 is a detail sectional and plan view substantially on the line 3—3 of Figure 2 to show a form of articulated joint between the clutch shifting device.

Figure 4 is a detail sectional view substantially on line 4—4 of Figure 2 showing means for automatically disconnecting the clutch when a respective wheel becomes the pivoting wheel when the vehicle is in the course of turning.

Figure 1:
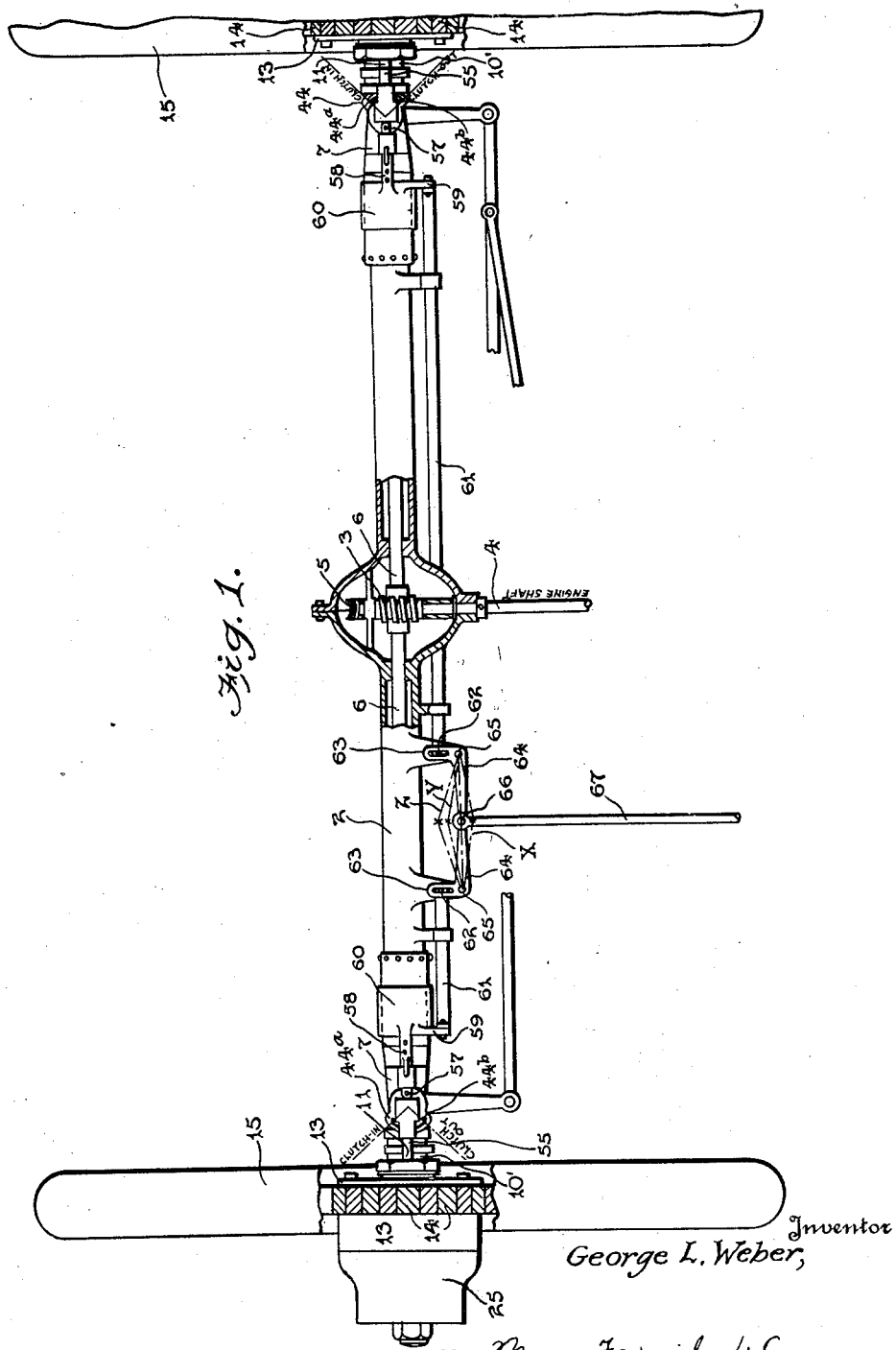

In Figure 1, 2 represents a suitable axle structure in the form of a tubular housing, at a suitable location on which there is encased a worm or screw 3 fast on a driving shaft 4 which may be driven from any suitable source of power, as for instance, an engine mounted upon the vehicle of which the axle 2 may form a part. The worm 3 engages and constantly drives, whilst the engine is running, a worm wheel 5 which is secured on an inner shaft 6 extending through the housing and terminating at the knuckle trunnions 7—7 in a suitable connection, here shown as a universal joint 8 from which extends a wheel spindle 9, of which there is one at each end of the axle shaft 6.

The center of the universal joint 8 alines with the center of the steering knuckle 10 journaled in the trunnion 7, this knuckle comprising an outwardly extending sleeve 10′ shown as slotted at 11 to receive a portion of the gear controls to be later described and thence continuing and carrying a set of ball bearings 12 on which ride the hub 13 carrying spokes 14 of wheels indicated at 15—15 (Figure 1). The outer end of each wheel hub 13 is shown as provided with exterior gear teeth 16 engaging respective teeth 17 of a reverse gear block 18 having another set of gear teeth 19 which latter engage a gear 20 loosely mounted on the hollow sleeve 10′. The reverse gear block 18 of which there may be a suitable number is mounted loosely on a trunnion 21, of which there is one for each gear block 18, these trunnions extending parallel to the driving spindle 9 and uniting at their outer ends with radial arms 22 projected from a disk or hub 23 loosely mounted on the reduced end 9′ of the spindle 9. The carrier, comprising the disk or hub 23 with its trunnions 21 is preferably closed in a cap 25 threaded at 26 on to a complementary portion of the hub 13 which overhangs the reverse pinions 18. Set parallel to these gears and loosely mounted on the trunnions 21 there are low speed gears 29 designed to intermesh with another low speed gear 30 which also is loosely mounted on the spindle sleeve 10′ in a position adjacent the reverse gear 20 and the gears 29 are also provided to be positively interlocked to the carrier which includes the trunnions 21 by suitable means as for instance through a series of teeth 31 designed to engage a locking lever 32 pivoted at 33 on the respective trunnions 21 and operative in a manner to be later described.

To secure rotation of the carrier 23 this latter is shown as provided with one element 35 of a disk clutch structure 36 which includes a face ring 37 bearing against the outer of the rings 36 and adapted to be shifted to produce the desired friction between the disks through means of the levers 38 pivoted at 39 on the trunnions 21 and adapted to be shifted outwardly through means of a shift ring 40 slidably mounted on the outer end of the driving spindle 9 and here shown as connected to a pair of shift rods 41 extending along the spindle 9 and thence directed outwardly in the slots 11 to connect with arms 42 provided with cam-engaging ends 43 sliding in internal cams 44 shown as in the form of grooves each having a portion 44ª concentric with the center of the steering knuckle 10 and having an eccentric portion 44ᵇ disposed to the rear of a line parallel to the axis of the driving axle so that when the wheel with its spindle 9 is turned about the knuckle joint, the cam-engaging member 43, when riding into the eccentric cam-portion 44ᵇ, will act to automatically retract the clutch rods 41, whereupon the disk 40 will be pulled inwardly to relieve the pressure upon the clutch levers 38 and the clutch rendered inoperative, so that one of the wheels 15 which is the inside wheel when making a turn with the vehicle is rendered inoperative whilst the opposite wheel is left in driving connection by reason of the cam-engaging portion 43 of its respective clutch rods 41 swinging concentric to the center of the knuckle or steering joint and is therefore permitted to remain in driving relation at the clutch.

To secure manual selection of low speed, high speed or reverse drive of the wheel through the planetary gears hereinbefore described, the gear 20 is provided with a keyway 20ª and the gear 30 is provided with a keyway 30ª, and the latter is also provided with an annular way 30ᵇ. There is shown as slidably mounted on the clutch rods 41, gear shift rods 50 each of which is provided at its outer end with a key 51 designed to be shifted by inward movement toward the wheel into the keyway 20ª in the reverse gear 20 or to be shifted by outward movement from the wheel into the keyway 30ª of the low speed gear 30 with the obvious result of locking the selected of these gears to the non-rotative sleeve 10′ on which the wheel is mounted so that in the instance of the gear 20 then the reverse gears 18 engaging the gear 20 will cause the rotation of the carrier with its trunnions 21 with respect to the hub 13, and this latter will be driven at a differential speed with respect to the now fixed gear 20 as the reverse pinions 18 roll around the sun gear 20. When the low speed gear 30 is locked to the spindle 10′ and becomes the sun gear then the carrier trunnions will roll around the sun gear and the gears 29 will drive the hub 13 at a low speed but in a direction reverse to that produced through the driving action of the reverse gears 18.

To obtain a high speed connection between the driving axle 9 and the carrier trunnions 21, it is only necessary to shift the locking rods 50 outward until the end of the key or rods 50 engage a disk 52 slidably mounted on the spindle 9, after which this disk 52 can be shifted outwardly from the wheel and against the levers 32 so that they will interlock with the gears 29, whereupon a direct drive between the wheel organization and the spindle 9 is effected through the clutch 36. Interposed between the high speed disk 52 and the clutch disk 40 there is an expansion spring 53 having the purpose of normally closing the friction clutch 36 and throwing the high speed disk 52 so that it will, through its connection with the levers 32, disconnect the latter from the gears 29.

To secure the longitudinal movement of the locking rods 50 as may be desired, these latter are extended inwardly toward the steering knuckle and then outwardly where they are connected to radial arms 55 which are bent angularly at 56 and connected through a suitable flexible means here shown as a short section of chain 57, the other end of which is connected to angle arm 58 of shift rod 59, two of which are clearly shown in Figure 1 mounted on sleeves 60 of which there is one slidably mounted on and adjacent each end of the housing 2. These sleeves 60 are each shown as connected to shift bars 61 having pins 62 engaging slotted arms 63 of levers 64 which are pivoted at 65 on the housing 2, the long arms of the levers 64 being directed toward each other and connected at a common joint 66 to the end of a controller rod 67 which may extend to any suitable operator's station or seat on the vehicle and may be operated either by hand lever or pedal as may be desired.

In operation, the controlling rod 67 may be shifted by the operator to the position shown in Figure 1 at which time the various shift connections between this rod 61 and the locking keys 51 relative to each wheel will be so disposed that the keys 51 are in a neutral relation with respect to the sun gears 20—20 and the clutch 36 is in its normal or closed and driven relation with respect to the carrier 23 so that the latter is driven idly by the rotation of the spindle 9. If the operator desires to back the car, it is only necessary to pull the control rod 67 which will bring the shift levers 64—64 back to the dotted line position X and the several keys 51 will be locked to the reverse pinions 20 and the vehicle will be caused to back. If it be desired to shift into the low speed forward drive, the operator shifting the rod 67 to the neutral position shown in Figure 1 has only to shift the rod forwardly which will swing the levers 64 forwardly to the position Y whereupon the several locking keys 41 will be shifted into locking position with the low speed gears 30 and the wheels will be driven forwardly at low speed. Finally, to select the high speed, the operator again shifts the rod 67 forwardly to the position marked Z (Figure 1) which causes the keys 51 to be shifted from locking position with the gears 30 into the ways 30$^b$ and against the high speed disk 52 whereupon the latter is thrown and locks the levers 32 to the respective gears 29.

It will be seen by the utilization of a flexible connection between the arms 56 and 58 which control the locking keys 51 that irrespective of the turning movement of the wheel spindle bodily and angularly about the axis of the knuckle spindle 10, there will be no disconnection or change of position of the locking keys 51 and the drive will be continuous through the locked element but in the event of a turning movement of the vehicle that wheel which is on the inside of the turn will be automatically disconnected by the release of pressure at the clutch 36 through the action of the cam 44 on the arms 42, but as the driving spindles 9 are brought into axial alignment with the driving axle 6, the clutch is again closed for driving purposes.

What is claimed is:

1. In a vehicle wheel, the combination of a hollow axle including a steering knuckle having a stationary part; a wheel hub mounted to turn with the axle; a drive shaft, a spindle flexibly connected to said drive shaft in the axis of the steering knuckle, a carrier mounted to turn freely on the shaft; arms in the hub borne by said carrier planetary gears on the arms, in mesh with sun gears and hub gears for transmitting power from the arms to the hub; a clutch for transmitting power from the shaft to the arms; and a shifting member extending through the axle and cooperating with the stationary part of the steering knuckle, for operating the clutch.

2. In a vehicle wheel, the combination of hollow axle including a steering knuckle having a stationary part; a wheel hub mounted to turn with the axle; a drive shaft, a spindle flexibly connected to said drive shaft in the axis of said steering knuckle, entering the hub; transmission gears in the hub; a clutch in the hub; a cam on the stationary part of of the steering knuckle; and a shifting member cooperating with the cam and extending through the axle, for releasing the clutch when the wheel is swivelled in one direction.

In testimony whereof I affix my signature.

GEO. L. WEBER.